United States Patent [19]

Kato et al.

[11] Patent Number: 4,509,638

[45] Date of Patent: Apr. 9, 1985

[54] CONVEYING SYSTEM FOR PRESS WORK MATERIALS

[75] Inventors: Yoshinori Kato, Otsuki; Makoto Matsui; Zenichiro Nonaka, both of Kanagawa, all of Japan

[73] Assignee: Aida Engineering, Ltd., Kanagawa, Japan

[21] Appl. No.: 479,977

[22] Filed: Mar. 29, 1983

[30] Foreign Application Priority Data

Apr. 8, 1982 [JP] Japan .................................. 57-58617

[51] Int. Cl.³ ............................................. B65G 47/91
[52] U.S. Cl. ................................... 198/486; 198/488; 414/752
[58] Field of Search ................ 198/486, 488; 414/751, 414/752, 753

[56] References Cited

U.S. PATENT DOCUMENTS

| | | | |
|---|---|---|---|
| 3,225,891 | 12/1965 | Hickin et al. | 414/752 X |
| 3,363,779 | 1/1968 | Matsushima | 198/486 X |
| 4,361,413 | 11/1982 | Toda | 414/752 |

Primary Examiner—Jeffrey V. Nase

Attorney, Agent, or Firm—Wenderoth, Lind & Ponack

[57] ABSTRACT

A device for conveying materials, particularly between presses. A moving member is mounted to a main body for horizontal reciprocal movement. A crank shaft is rotatably mounted to the moving member for horizontal movement therewith. A feed bar is supported for sliding horizontal movement by a feed bar guide which is connected to the crank shaft by a connecting rod. Holding members such as vacuum cups are mounted to opposite ends of the feed bar for holding the materials to be conveyed. A belt having a horizontally extending upper portion is carried by a pair of pulleys for reciprocal movement about the pulleys. A revolving member is mounted on the crank shaft and coupled with the upper portion of the belt so as to moved horizontally between the pulleys and revolve at each pulley a pre-set angle about each pulley in response to reciprocal movement of the belt. Revolution of the revolving member rotates the crank shaft so as to vertically move the connecting rod, the feed bar guide and the feed bar so that the feed bar move in vertical and horizontal directions when the belt is reciprocated.

9 Claims, 7 Drawing Figures

CONVEYING SYSTEM FOR PRESS WORK MATERIALS

BACKGROUND OF THE INVENTION

The present invention relates to a conveying system for materials to be processed by a press and, more particularly, to a system which is installed between presses to convey partly finished products which have been worked by one press to another press.

There have been known two types of such conveying systems for continuously conveying press materials, i.e. the transfer press type and the transfer press line type. The former is characterized in that plural metal molds are installed in one press unit, and a pair of feed bars parallel to the metal molds and fingers mounted on the feed bars are provided to sequentially convey materials to the metal molds for continuous working. The transfer press line, on the other hand, comprises plural presses, and feed bars which are of a length identical to that of a press and have fingers similarly to the former type, the feed bars being driven to sequentially feed materials to press metal molds.

The transfer press type of system is advantageous in that the system can be made compact as 8 to 10 metal molds are arranged in one press without leaving any space therebetween. However, as all the upper molds are attached on a slide (a ram), the press is driven irrespective of the necessary number of work steps and therefore if materials can be processed to form a product in a lesser number of steps than the total of the metal molds, a number of the metal molds are idled, which is uneconomical. If the work requires more working steps than the number of metal molds, on the other hand, a product cannot be completed in the press, presenting inconvenience and disadvantages.

Although a desired number of presses may be installed in the transfer press line type of system, if too many presses are installed, the feed bars become too long to be driven smoothly. In the transfer press line, presses must be arranged in the linear direction and the metal molds of the respective presses must be aligned in height in order to convey materials properly. This can be inconvenient to the operation, since operation of the machines is unnecessary for particular work can be suspended, operation of the feed bars cannot be suspended.

OBJECT OF THE INVENTION

The object of the present invention is to provide a conveying device which is to be installed between presses for conveying materials therebetween, which includes feed bars, a moving member for supporting feed bars and an accelerating mechanism installed between said feed bars and said moving member, and which can be made compact in size.

Another object of the present invention is to provide a conveying device which can drive the feed bars both in the horizontal direction or the direction of conveying material and in the vertical direction or the direction of mounting the materials on the metal molds, by using one driving mechanism, thereby simplifying the control system thereof as well as conveying materials accurately without deviation in timing.

Still another object of the present invention is to provide a conveying system which is economical, as only the necessary number of presses and conveying devices out of those installed in a plural number can selectively be driven by providing a driving mechanism for each of the respective devices.

Still another object of the present invention is to provide a system wherein as each component device is installed independently, presses are not required to be arranged in parallel but can be arranged in an arbitrary position to suit the particular needs of a plant.

SUMMARY OF THE INVENTION

The system according to the present invention comprises a moving member which is moved by guide rods mounted on a body in a horizontal direction or the direction to convey the material, feed bar guides which are connected to an eccentric member of a crank shaft mounted on said moving member via a connecting rod and which are supported on said moving member in a manner to allow vertical movement thereof, and feed bars housed in said feed bar guide together with an accelerator, wherein said moving member is driven by an endless belt and the feed bars move in the horizontal direction until the time the moving member reaches a pulley which is provided to support said moving member horizontally while the feed bars move downward when the moving member is inclined along the pulley.

Suction mechanisms are provided on both ends of the feed bar for catching the materials. The suction mechanism operates to suck up the materials on the press metal mold when the feed bar is lowered and to bring them to an intermediate receiving table mounted in front of the conveying system. As the interval between said suction mechanisms is set at ½ of the center distance between presses, the material which is already mounted on the intermediate receiving table is transferred to the second press by the feed bar of adjacent conveying device.

The distance to limit the horizontal movement of the feed bars is determined by the distance between shafts of the two pulleys suspending the belt while the distance to limit the downward movement of the feed bars is determined by the angle at which the moving member is inclined along a pulley. Although said distance between the pulley shafts needs to be at most ½ of the distance between two adjacent presses, an accelerator is mounted between the moving member and the feed bar in the present invention system so that it was reduced to ¼ of the distance between presses, thereby making the whole structure compact in size.

A timing belt having teeth inside thereof is used as the belt driving the moving member, and a pulley having corresponding teeth are used in order to accurately drive the moving member.

DETAILED DESCRIPTION OF THE INVENTION

Figure 1:
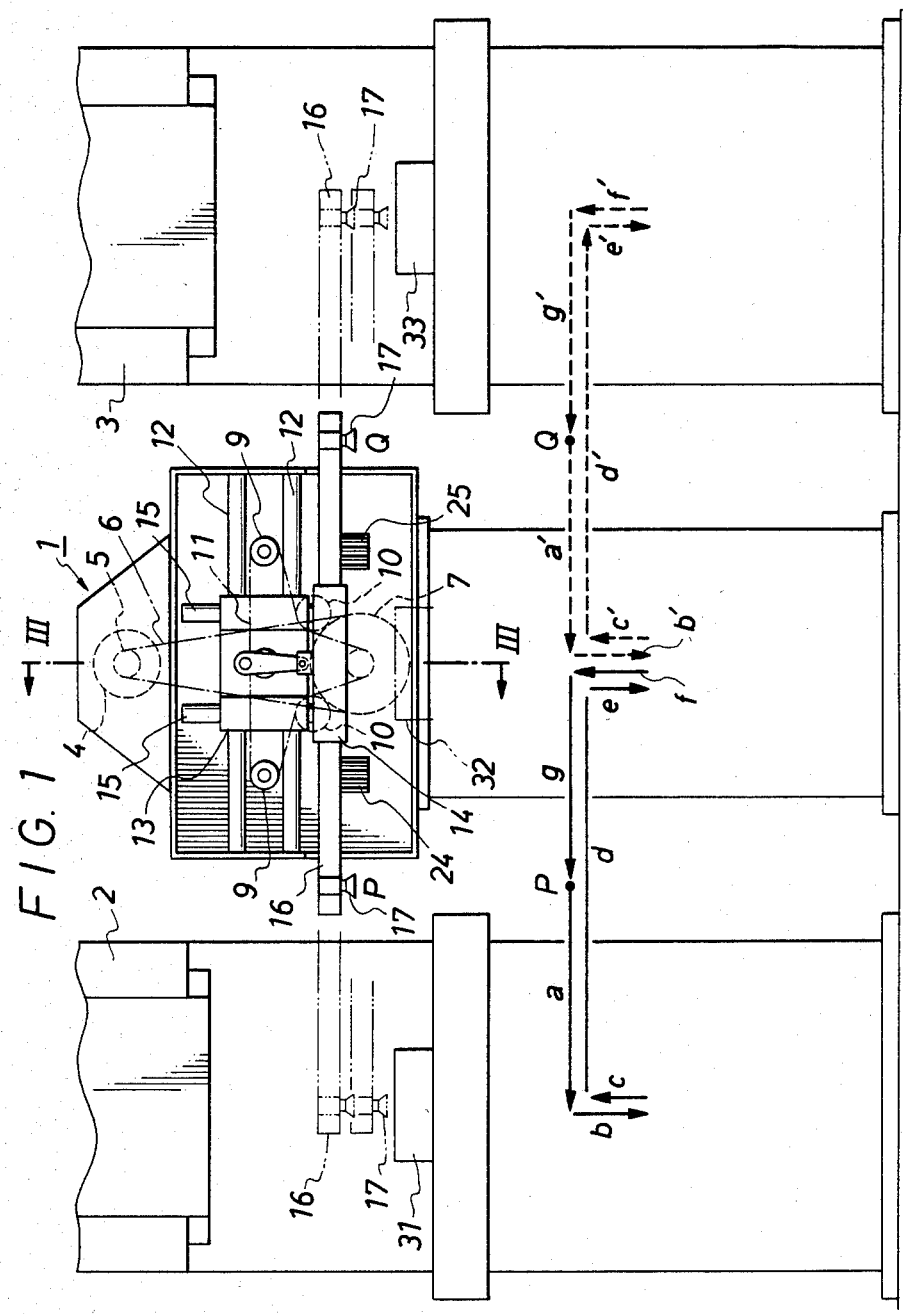
FIG. 1 is a frontal view of the conveying system according to the present invention installed between presses.
Figure 2:
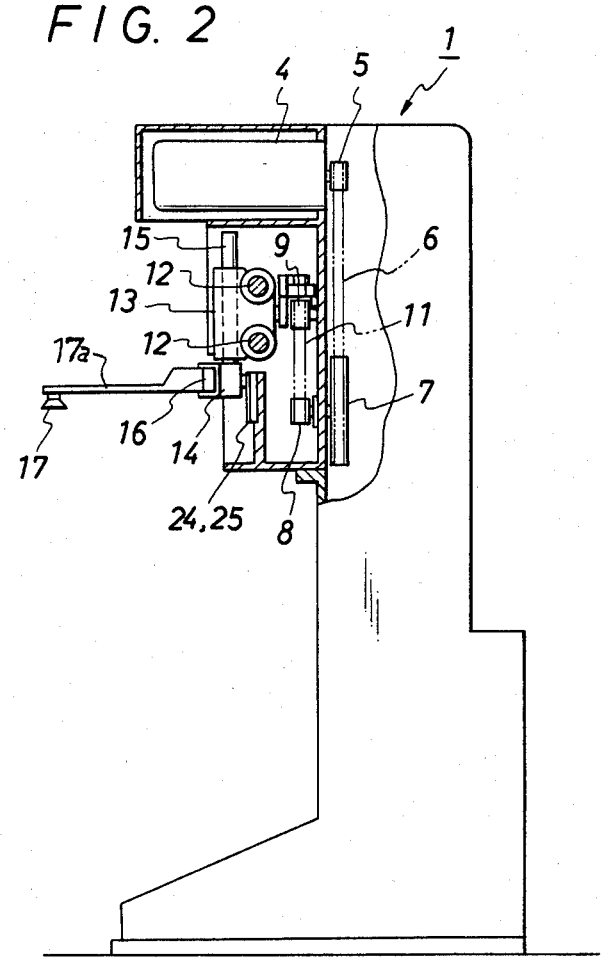
FIG. 2 is a partially exploded side view of the conveying system.

Referring now to FIGS. 1 and 2, a conveying device 1 is installed between the first press 2 and the second press 3.

On the body of the conveying device 1 is mounted an NC motor 4 and a belt 6 is suspended on a pulley 5 of said NC motor output shaft, and another pulley 7. Belt 6 is a timing belt having teeth inside thereof and the pulleys 5 and 7 are provided with corresponding teeth to drive the timing belt. All the belts to be used in this system are timing belts. Still another pulley or a main pulley 8 is mounted on the shaft of said pulley 7 to be coaxially rotated with the pulley 7.

Two timing pulleys 9 are horizontally mounted on the conveying device body in a freely rotatable manner. Those pulleys 9 are connected to main pulley 8 by a belt which is kept properly horizontal and tense by intermediate pulleys 10 provided between the main pulley 8 and the timing pulleys 9. Two horizontal guide rods 12 are fixedly attached to said body at an upper and a lower position adjacent to the timing pulleys 9 to guide reciprocatingly a moving member 13 mounted thereon.

A feed bar guide 14 is secured to the lower part of said moving member 13 by vertical guide shafts 15 which projected vertically from the feed bar guide 14 and extend into the moving member 13. The feed bar guide 14 is movable in the vertical direction following the vertical guides 15. A feed bar 16 is mounted on said feed bar guide 14 in a manner to allow horizontal displacement, while holding members 17 are provided on both ends of the feed bar 16 for gripping materials.

As described hereinbelow, an accelerator mechanism is provided between the moving member 13 and the feed bar 16 in the system of the present invention and it is possible to set the axial distance between the two timing pulleys 9 which keep the belt 11 at a proper tension at $\frac{1}{4}$ of the center distance between the presses and the mounting distance of the holding members 17 of the feed bar at $\frac{1}{2}$ thereof.

Each holding member 17 comprises vacuum cups provided on the tip of an arm 17a projecting in front of the feed bar 16 and suction pipes (not shown).

When the NC motor 4 is revolved reciprocatingly, the pulley 5, the belt 6, and the pulley 7 are rotated to rotate the main pulley 8 coaxially, which in turn moves the belt 11 suspended on the timing pulleys 9 together with the moving member 13. The belt 11 moves horizontally between the timing pulleys 9, but when the moving member 13 arrives at a pulley 9, the moving member 13 stops while the feed bar guide 14 alone moves downward.

Figure 3:
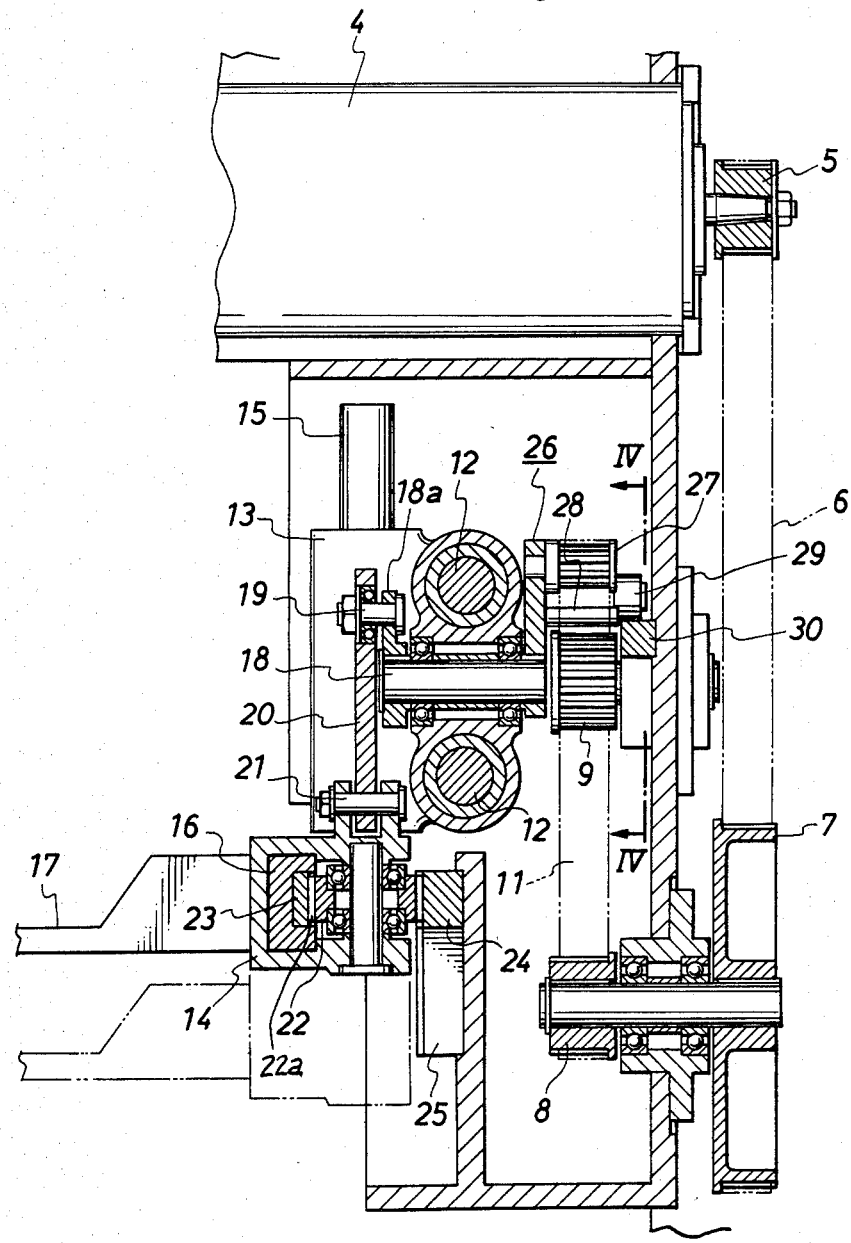
FIG. 3 is a sectional view of the system shown in FIG. 1 along the line III—III.

Referring now to FIG. 3, the moving member 13 is provided with a crank shaft 18 which intersects the guide rod 12 perpendicularly and which projects on both ends thereof. A connecting rod 20 is fixed with a pin 19 on a crank 18a of the crank shaft 18 on one end thereof which is positioned in front of the moving member 13 but eccentric from the crank shaft. The crank shaft 18 is interposed between the timing pulleys 9 and at a height identical with that of the timing pulleys 9. The lower end of the connecting rod 20 is connected with a pin 21 to the feed bar guide 14 which is supported by said vertical guide shafts 15 on the moving member 13. The feed bar guide 14 accordingly is moved vertically in respect of the moving member 13 via the connecting rod 20 together with the feed bar 16.

Feed bar guide 14 is defined as a square column having one open end, in which the feed bar 16 is housed. A pinion shaft 22 is provided vertically in the opening of the feed bar guide 14 so that the pinion 22a of said pinion shaft 22 may be geared with a rack 23 mounted on the opposing surface of the feed bar 16 as well as geared with a horizontal rack 24 provided on the body. Since the feed bar guide 14 is to move downward, after advancing towards the horizontal direction, the horizontal rack 24 on the body is required to have lower ridges 25 of length sufficient to allow the feed bar guide 14 to descend fully to the position corresponding to that of pulleys 9.

As moving member 13 moves along the guide rods 12, the pinion 22a of the feed bar guide 14 is geared with the horizontal rack 24 and at the same time geared with the rack 23 of the feed bar 16 to move the feed bar 16. As a result, as the rack 23 moves at a speed twice that of the pinion 22a, the feed bar 16 moves therewith to cover a horizontal distance twice that covered by the moving member 13.

Figure 4:
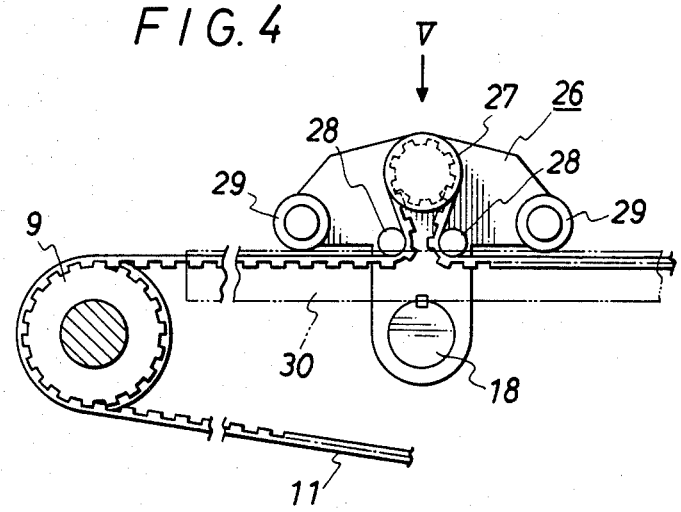
FIG. 4 is a view as seen in the direction of the line IV—IV in FIG. 3.
Figure 5:
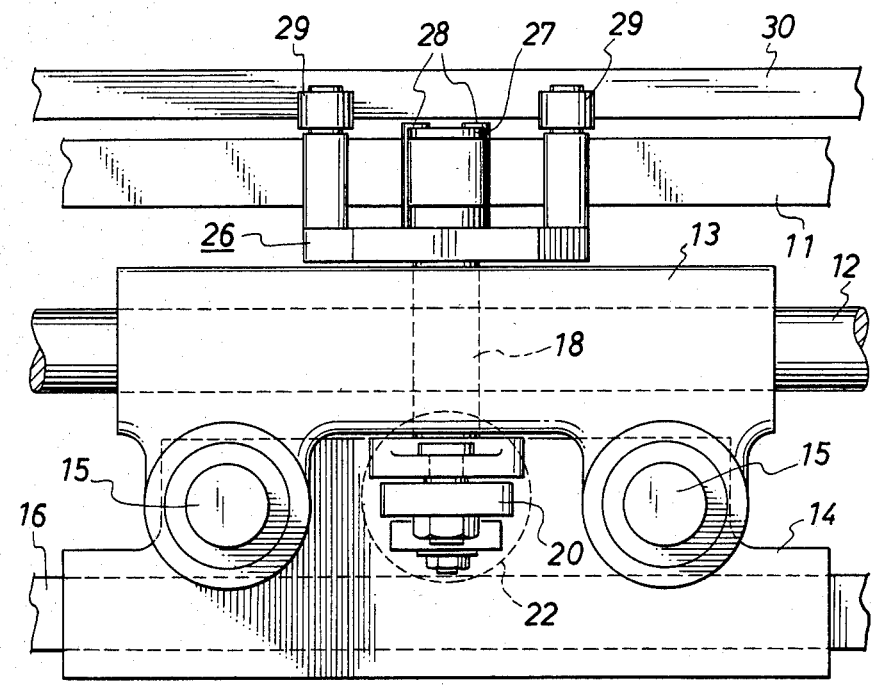
FIG. 5 is a view as seen in the direction of V in FIG. 4.

Referring to FIGS. 3 to 5, a revolving member 26 is provided at the other end of the crank shaft 18 in the back of the moving member 13 and a toothed ring 27 to engage with the teeth of the timing belt 11 is provided on the outer periphery of said revolving member 26 at a position eccentric to the crank shaft 18. In order to secure the engagement of the belt 11 wound on the engaging ring 27 as well as to align the pitch on the teeth of the linear portion of the belt 11, two auxiliary lock pins 28 are provided immediately below said engaging ring 27. The belt 11 suspended on the timing pulleys 9 are thus connected to the moving member 13 by winding the toothed engaging ring 27 of the revolving member 26 of the crank shaft 18 on the member 13, thereby causing the moving member 13 to follow the belt as the belt moves on.

Two rollers 29 are provided projectingly on the outside of the belt 11 in a manner to support the revolving member 26 with the engaging ring 27 therebetween. In particular, these rollers 29 are abutted on the upper surface of the guide rail 30 provided on the body along the linear portion of the belt and which extends to near the timing pulleys 9. This acts to move the moving member 13 stably as well as to hold the engaging ring 27 of the revolving member 26 above the crank shaft 18.

During the time the moving member 13 reciprocates between the timing pulleys 9, the feed bar 16 moves horizontally. The crank member 18a mounted on the crank shaft 18 and the revolving member 26 are adapted to stay at the top dead point during that time. The feed bar 16, therefore, is made to reciprocate together with the feed bar guide 14 as it is elevated at the point.

Figure 6:
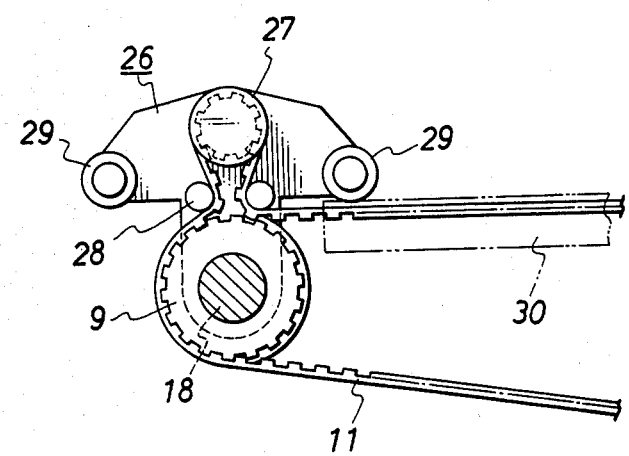
FIGS. 6 and 7 are explanatory views to indicate the operation of the moving member.
Figure 7:
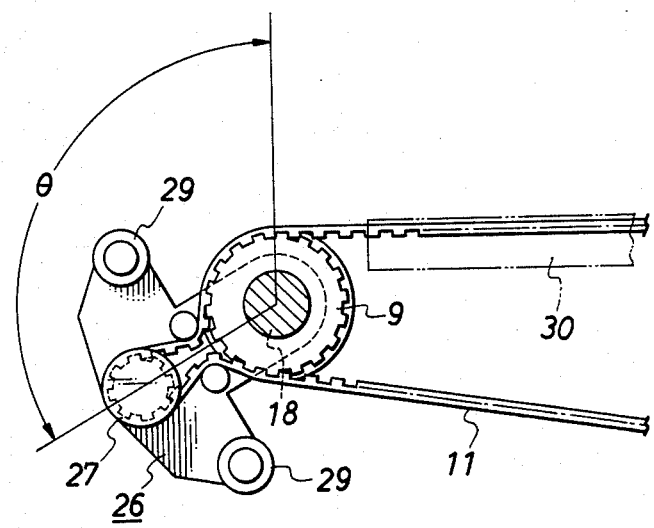

When the moving member 13 is moved to the right in FIG. 1 (note that the moving member 13 travels to the left in FIGS. 4, 6 and 7) to arrive at the position indicated in FIG. 6 to align the center of the crank shaft 18 with that of the left timing pulley 9, the left roller 29 of the revolving member 26 has already been derailed from the guide rail 30 and the right roller 29 assumes a position immediately before being derailed from the rail 30. As the belt 11 keeps on rotating, the right roller 29 also becomes derailed, and the revolving member 26 is rotated counter-clockwise together with the crank shaft 18 as shown in FIG. 7. When the revolving angle of the revolving member 26 reaches a desired angle $\theta$, the NC motor 4 detects the predetermined revolving rate and suspends the motor.

The inclination of the revolving member 26 in FIG. 7 causes the feed bar guide 14 to descend together with rotation of the crank shaft 18. More particularly, the revolution of the crank shaft 18 rotates the connecting rod 20 from the top dead point by θ to lower the feed bar guide 14 with the vertical guides 15 below the moving member 13. At this time, the pinion 22a of the feed bar guide 14 mentioned above descends while engaged with the lower ridge 25 of the horizontal rack 24, thereby avoiding separation between them. The NC motor 4 counter-rotates after the suspension to raise the feed bar 16, move the moving member 13 to the left in FIG. 1, and lower the feed bar on the left end in the manner similar to that described above. The above operations are repeated to sequentially convey materials between presses.

Referring again to FIG. 1, the operation to convey material by this system will be described below. A metal mold 31 is mounted on the first press 2, an intermediate receiving table 32 provided in front of the system and a metal mold 33 is mounted on the second press 3. For facilitating description, the left side holding member 17 of the feed bar 16 is denoted with the letter P and the right one with the letter Q.

In the state where the feed bar is at the position indicated with the solid line in the drawing, holding members P and Q do not suck up the materials, but the materials have been fed to the metal molds 31 and 33, with the materials mounted on the intermediate receiving table 32. During the time the presses are in operation and the slides lowered for working the material, the moving member 13 stops at the center, and holding members P and Q are suspended to avoid interfering with the presses. When the slide of a press is raised, member P moves to the points, a, b, c while member Q moves to the points a', b', c'. Member P sucks up semi-finished products from the metal mold 31 of the first press 2 while member Q sucks up a semi-finished product from the receiving table 32 (in idle stage) which has been conveyed thereto in the previous step and moves upward.

Subsequently member P moves to the points d, e, f, while member Q to the points d', e', f' so that member P supplies the semi-finished products to the receiving table 32 while member Q moves to the metal mold 33 of the second press 3. Then members P and Q move to the points g and g' and stop there to allow the presses to carry out the work during that time.

What is claimed is:
1. A device for conveying materials, comprising:
   a main body;
   a moving member mounted on said main body for horizontal reciprocal movement with respect thereto;
   a crank shaft rotatably mounted to said moving member for horizontal movement therewith;
   a feed bar;
   a feed bar guide supporting said feed bar for sliding horizontal movement of said feed bar;
   a connecting rod connecting said feed bar guide to said crank shaft;
   holding members mounted to opposite ends of said feed bar for holding the materials to be conveyed;
   a belt having a horizontally extending upper portion;
   a pair of pulleys mounted on said main body so as to support said belt with said upper portion extending horizontally for reciprocal movement about said pulleys; and
   a revolving member mounted on said crank shaft and coupled with said upper portion of said belt so as to be moved horizontally between said pulleys and revolve at each pulley a pre-set angle about said each pulley in response to reciprocal movement of said belt, revolution of said revolving member rotating said crank shaft so as to vertically move said connecting rod, said feed bar guide and said feed bar, whereby said feed bar moves in vertical and horizontal directions when said belt is reciprocated.

2. A device as in claim 1, further comprising a horizontal rack mounted on said body, and a pinion mounted on said feed bar guide and geared with said rack and said feed bar so as to transmit the velocity of said feed bar guide to said feed bar, thereby to increase the velocity of said bar guide to twice that of said feed bar guide.

3. A device as in claim 2, wherein said horizontal rack has a lower ridge extending downward on the end thereof.

4. A device as in claim 1, wherein said belt is a timing belt with belt teeth inside thereof and said pulleys are timing pulleys having pulley teeth thereon in mesh with said belt teeth.

5. A device as in claim 1, further comprising an engaging ring on said revolving member connecting said revolving member to said belt, two rollers mounted on said revolving member on opposite sides of said engaging ring, and a horizontal guide rail on said main body extending only between said pulleys so as to provide rolling support for said two rollers when said revolving member is between said pulleys.

6. A device as in claim 5, wherein said pulleys are timing pulleys having pulley teeth thereon, said engaging ring is a rotatable ring having ring teeth thereon, and said belt is a timing belt with belt teeth inside thereof in mesh with said ring teeth and said pulley teeth.

7. A device as in claim 1, further comprising two horizontally extending parallel guide rods mounted to said main body and slidably supporting said moving member such that said moving member is vertically supported by said two guide rods during the horizontal reciprocal movement thereof.

8. A device as in claim 1 wherein said holding members mounted on said feed bar include vacuum cups.

9. A device as in claim 1, further comprising two vertical guides horizontally supporting said feed bar guide on said moving member such that said feed bar guide is vertically movable with respect to said moving member.

* * * * *